United States Patent
Cui et al.

(10) Patent No.: US 11,648,526 B2
(45) Date of Patent: May 16, 2023

(54) LIGHTWEIGHT MODIFIED FILTER MATERIAL, PREPARATION METHOD THEREFOR AND USE THEREOF

(71) Applicant: JILIN MAGIC ENVIRONMENTAL TECHNOLOGY CO., LTD., Jilin (CN)

(72) Inventors: Yang Cui, Jilin (CN); Jun Soo He, Seoul (KR); Xuelie Cui, Jilin (CN)

(*) Notice: Subject to any disclaimer, the term of this patent is extended or adjusted under 35 U.S.C. 154(b) by 115 days.

(21) Appl. No.: 16/652,757

(22) PCT Filed: Apr. 11, 2018

(86) PCT No.: PCT/CN2018/082690
§ 371 (c)(1),
(2) Date: Apr. 1, 2020

(87) PCT Pub. No.: WO2019/076009
PCT Pub. Date: Apr. 25, 2019

(65) Prior Publication Data
US 2020/0230572 A1    Jul. 23, 2020

(30) Foreign Application Priority Data

Oct. 18, 2017   (CN) .......................... 201710971200.5

(51) Int. Cl.
*B01J 20/10*     (2006.01)
*B01D 39/06*    (2006.01)
(Continued)

(52) U.S. Cl.
CPC ............ *B01J 20/103* (2013.01); *B01D 39/06* (2013.01); *B01J 20/06* (2013.01); *B01J 20/08* (2013.01);
(Continued)

(58) Field of Classification Search
CPC . B01J 20/103; B01J 20/08; B01J 20/06; B01J 20/28004; B01J 20/28011;
(Continued)

(56) References Cited

U.S. PATENT DOCUMENTS 4,192,664 A * 3/1980 Joshi ...................... C03B 19/08
106/1.05

FOREIGN PATENT DOCUMENTS

| CN | 102001832 A | 4/2011 |
| CN | 103880289 A | 6/2014 |

(Continued)

OTHER PUBLICATIONS

Machine Translation of CN Xuelie 2015 (Year: 2015).*
International Search Report and Written Opinion from PCT/CN2018/082690 dated Jul. 3, 2018.

*Primary Examiner* — Allison G Fitzsimmons
(74) *Attorney, Agent, or Firm* — Warner Norcross + Judd LLP (57) ABSTRACT

A lightweight modified filter material, a preparation method therefor and use thereof, the lightweight modified filter material being prepared from the following components in parts by mass: 75-100 parts of waste glass, 5-20 parts of a metal oxide modifier and 1-10 parts of a foamer. The lightweight modified filter material has the advantages of being lightweight, having large specific surface area, a high isoelectric point, porosity and the like, increasing the isoelectric point and service life of the filter material. The added metal oxide can be combined with $SiO_2$ in the glass to form Si—O—Me (Me metal ions) and enter the glass network.

13 Claims, 2 Drawing Sheets

(51) Int. Cl.
- *B01J 20/06* (2006.01)
- *B01J 20/08* (2006.01)
- *B01J 20/28* (2006.01)
- *B01J 20/30* (2006.01)
- *C02F 1/28* (2023.01)
- *C03B 19/08* (2006.01)
- *C03C 1/00* (2006.01)
- *C03C 11/00* (2006.01)

(52) U.S. Cl.
CPC ... *B01J 20/28004* (2013.01); *B01J 20/28011* (2013.01); *B01J 20/28016* (2013.01); *B01J 20/28059* (2013.01); *B01J 20/3021* (2013.01); *B01J 20/3064* (2013.01); *B01J 20/3078* (2013.01); *C02F 1/281* (2013.01); *C03B 19/08* (2013.01); *C03C 1/002* (2013.01); *C03C 11/007* (2013.01); *B01D 2239/10* (2013.01); *B01D 2239/1208* (2013.01); *B01D 2239/1241* (2013.01)

(58) Field of Classification Search
CPC ............ B01J 20/28016; B01J 20/28059; B01J 20/3021; B01J 20/3064; B01J 20/3078; B01D 39/06; B01D 2239/10; B01D 2239/1208; B01D 2239/1241; C02F 1/281; C03B 19/08; C03C 1/002; C03C 11/007
USPC ........................................................ 210/660
See application file for complete search history.

(56) References Cited

FOREIGN PATENT DOCUMENTS

| | | |
|---|---|---|
| CN | 104692667 A | 6/2015 |
| CN | 104998466 A | 10/2015 |
| CN | 107572830 A | 1/2018 |
| JP | 2009011895 A | 1/2009 |
| WO | WO-2016060624 A1 * | 4/2016 ............... A61L 9/00 |

* cited by examiner

LIGHTWEIGHT MODIFIED FILTER MATERIAL, PREPARATION METHOD THEREFOR AND USE THEREOF

CROSS-REFERENCE TO RELATED APPLICATIONS

The present disclosure claims the priority of the Chinese Patent Application No. 201710971200.5, entitled "Lightweight Modified Filter Material, Preparation Method Therefor and Use Thereof", filed with the Chinese Patent Office on Oct. 18, 2017, the entity of which is incorporated herein by reference.

TECHNICAL FIELD

The present disclosure relates to the technical field of water treatment, and particularly to a lightweight modified filter material and a method for preparing the same and the use thereof.

BACKGROUND

With the development of the society and the continuous improvement of people's living standards, higher and higher requirements are imposed on the quality of the water environment. Therefore, increased drinking water standards and consolidated wastewater discharge standards have become inevitable. For example, the Ministry of Health in China issued the new "Standards for Drinking Water Quality" (GB 5749-2006) on Dec. 29, 2006, which is basically close to the advanced world level in the overall index structure and quantity; and the Ministry of Environmental Protection in China decided in 2015 to revise "Discharge Standard of Pollutants for Municipal Wastewater Treatment Plant" (GB 18918-2002) (draft for comments), in which the discharge Indices for pollutants are further consolidated. This also puts forward higher requirements for drinking water treatment technology and advanced wastewater treatment technology.

Figure 1:
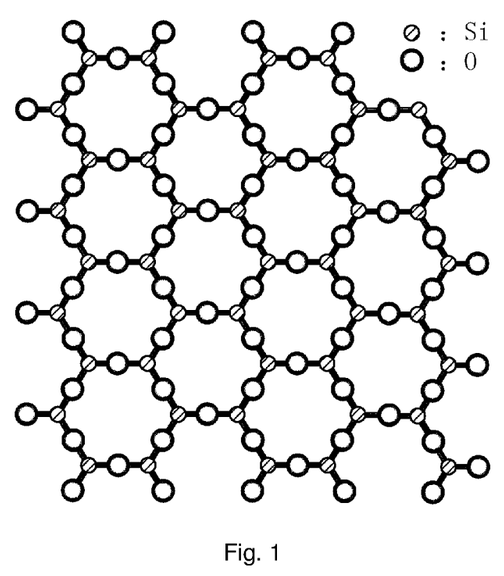
FIG. 1 shows a schematic diagram of the molecular structure of quartz sand.

Quartz sand is a water purification material widely used in various feedwater treatment, wastewater treatment and environmental governance. Its molecular structure is shown in FIG. 1. It can be seen from FIG. 1 that due to the limitation of the molecular structure of quartz sand, the oxygen atoms at the edge (fracture surface) of the quartz sand exist in form of unsaturated "non-oxygen bridges" (Si—O$^-$), making the surface of the quartz sand negatively charged; in addition, because the surface of the quartz sand filter material has less pores and has small specific surface area, the removal effect of the quartz sand on toxic substances (heavy metal ions and the like), bacteria, viruses and organic matters (mostly negatively charged) in water is pretty poor.

Figure 2:
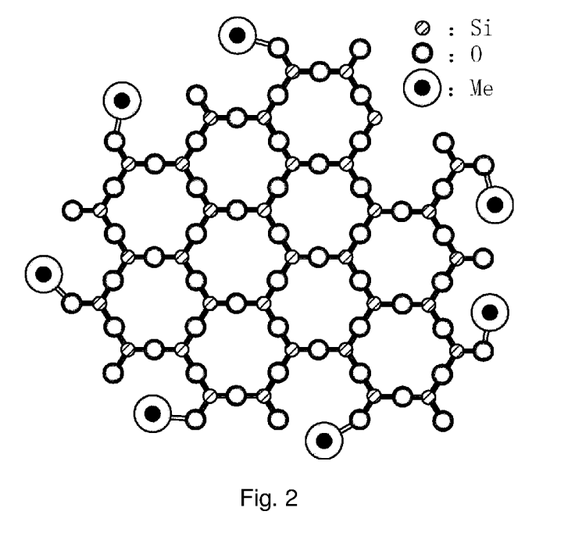
FIG. 2 shows a schematic diagram of the molecular structure of modified quartz sand (Me represents metal ions)

The zeta ($\zeta$) potential of the filter material can be changed by coating the surface of the traditional quartz sand filter medium with a metal oxide or hydroxide (as shown in FIG. 2). Nevertheless, the current modification method of the filter material is limited to the surface of quartz sand, wherein a metal oxide is used to form a thin coating on the surface of the quartz sand filter material, so as to improve the quality of treated water. However, such modification method still has fatal defects: for example, after a long period of immersion of the filter material in water and due to the backwashing effect of the water flow with the filter material, the surface coating would easily be worn out and fall off, and the quality of treated water gradually decreases, along with the prolonging of the service time, to the level of filtration by ordinary quartz sand. In addition, the specific surface area of the filter material is not significantly increased by the surface coating of the modified quartz sand, the adsorption effect thereof is also not significantly improved, so the promotion and the application of the modified filter material is ultimately restricted.

SUMMARY

Objects of the present disclosure comprise providing a lightweight modified filter material, which has the advantages of light weight, large specific surface area, high isoelectric point, porosity and the like, with the isoelectric point and the service life of the filter material being improved.

The objects of the present disclosure further comprise providing a method for preparing the lightweight modified filter material, wherein any metal oxide added in this method can form Si—O-Me (Me represents metal ions) combined with SiO$_2$ in the glass body for entrance into the glass network, which improves the polymerization degree of the structure, such that the hardness and the toughness of the glass body are raised, while the isoelectric point of the glass body is increased, accordingly, not only the service life of the filter material of foam glass is prolonged, but the water treatment effect thereof is also improved, and the practicability and the economic efficiency thereof are increased.

In order to achieve at least one of the above-mentioned objects of the present disclosure, the following technical solution is particularly employed:

A lightweight modified filter material is prepared from the components in the following parts by mass (weight):

75-100 parts of waste glass, 5-20 parts of a metal oxide modifier and 1-10 parts of a foaming agent (foamer).

Preferably, the lightweight modified filter material has a specific weight of 1.2-1.8 kg/L;

Preferably, the lightweight modified filter material has a void ratio of 60%-78%.

Preferably, the lightweight modified filter material is mainly prepared from the components in the following parts by mass:

80-95 parts of waste glass, 5-15 parts of a metal oxide modifier and 1-5 parts of a foaming agent.

Preferably, the metal oxide modifier is at least one selected from the group consisting of titanium oxide, ferric oxide, aluminum oxide and magnesium oxide.

Preferably, the foaming agent is at least one selected from the group consisting of carbon black, silicon carbide, calcium carbonate, dolomite powder, phlogopite, graphite and manganese dioxide.

Preferably, the lightweight modified filter material has a particle size of 0.5-2.0 mm.

Preferably, the lightweight modified filter material has a natural bulk unit weight of 0.5-1.8 kg/L.

Preferably, the waste glass is simple glass or foam glass.

Preferably, the foam glass has a void ratio of 60%-78%; and the specific weight of the foam glass is 1.2-1.7 kg/L.

Preferably, the filtration rate of the foam glass is 20-30 m/hr; and the expansion ratio of the foam glass is at most 200%.

Preferably, the foam glass has a natural bulk unit weight of 0.5-0.9 kg/L.

Preferably, the specific surface area of the foam glass is 25-35 m$^2$/g.

A method of preparing the lightweight modified filter material comprises the following steps:

crushing, pulverizing and grinding waste glass; then adding a metal oxide modifier and a foaming agent; and heat-melting, foaming, solidifying and cooling the mixture, pulverizing the mixture after cooling, and performing screening of the particle size to obtain the lightweight modified filter material.

Preferably, the crushed glass fragments are of a size of 3-5 cm; and the pulverized glass has a particle size of 50-200 μm.

Preferably, the foaming process specifically comprises the following step:

raising the temperature of a melting-foaming machine to 600-1100° C. with a heating rate of 8-12° C./minute, and performing the foaming step for 2-4 hours.

Preferably, the waste glass is foam glass, and a method of preparing the foam glass comprises the following steps:

1) adding a foaming agent, a foaming accelerator and a modifier into superfine glass powders and then mixing the same, so as to obtain mixed raw materials; and 2) melting and foaming the mixed raw materials and then cooling the same, hereby obtaining foam glass.

Preferably, in parts by weight, there are 93-97 parts of the superfine glass powders, 2-4 parts of the foaming agent, and 1-3 parts of the foaming accelerator and the modifier.

Preferably, the foaming accelerator is at least one selected from the group consisting of sodium nitrate, soda ash, borax, sodium fluorosilicate, sodium carbonate and ethylenediamine salt; and the modifier is at least one selected from the group consisting of antimonous oxide, sodium pyrophosphate and barium sulfate.

Preferably, before step 1), it further comprises the following step: crushing waste glass to obtain glass fragments of 3-5 mm, and pulverizing the glass fragments to obtain superfine glass powders having a particle size of 100-400 μm.

Use of the lightweight modified filter material in acting as water filtering medium.

In comparison with the prior art, the present disclosure has at least the following beneficial effects:

(1) As for the lightweight modified filter material provided in the present disclosure, a proper amount of a metal oxide is added when preparing the glass filter material, so as to enhance the strength of this lightweight filter material, and accordingly improve the isoelectric point and the service life of the filter material.

(2) The lightweight modified filter material provided in the present disclosure has the advantages of light weight, large specific surface area, high isoelectric point, porosity and the like.

(3) The lightweight modified filter material provided in the present disclosure has a specific weight of 1.2-1.8 kg/L, a particle size of 0.5-2.0 mm, a natural bulk unit weight of 0.5-1.8 kg/L, and a void ratio of 60%-78%.

BRIEF DESCRIPTION OF THE DRAWINGS

In order to more clearly describe the technical solutions in the specific embodiments of the present disclosure or in the prior art, the drawings required to be used in the description of the specific embodiments or the prior art will be simply presented below. Obviously, the drawings described below show certain embodiments of the present disclosure, and for a person ordinarily skilled in the art, other drawings could be obtained according to these drawings without inventive efforts.

DETAILED DESCRIPTION OF THE EMBODIMENTS

In the following contents, the technical solutions of the present disclosure will be described clearly and comprehensively in combination with the drawings and the specific embodiments. However, it could be understandable for a person skilled in the art that the embodiments described below are some of the embodiments of the present disclosure, but not all the embodiments thereof, and are merely used to explain the present disclosure, thus should not be deemed as limiting the scope of the present disclosure. Any other embodiments, obtained by a person ordinarily skilled in the art without inventive efforts based on the embodiments in the present disclosure, shall fall within the scope of protection of the present disclosure. Examples, for which no specific conditions are specified, are performed according to conventional conditions or conditions recommended by the manufactures. Reagents or instruments used herein, for which no manufacturers are specified, are conventional products available commercially.

The present disclosure provides a lightweight modified filter material, which is mainly prepared from the components in the following parts by mass:

75-100 parts of waste glass, 5-20 parts of a metal oxide modifier and 1-10 parts of a foaming agent.

Figure 3:
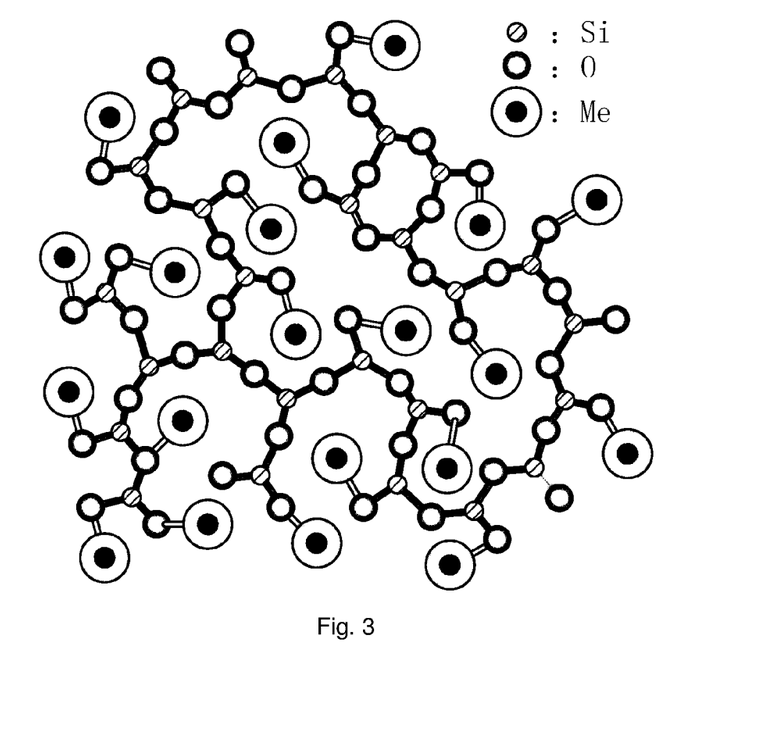
FIG. 3 shows a schematic diagram of the molecular structure of simple glass (Me represents metal ions).

In the prior art, although being cheap in price and stable in performance, quartz sand filter material still has disadvantages such as negatively charged surface, small specific surface area, low void ratio and low surface adsorption capacity. Moreover, modified quartz sand filter material is merely quartz sand coated with a thin metal oxide coating, wherein only surface modification is realized, the service life of the modified filter material is affected and a stable quality of treated water cannot be guaranteed, which restricts the popularization and the application of the modified filter material. In addition, glass, which is very common in our daily life, is actually a non-metallic material of silicates obtained by forming a continuous network structure from raw materials such as quartz (silicon dioxide) and soda ash, limestone, quartz and the like through melting at high temperature, and then obtaining the crystal thereof by cooling and solidification. It is rich in metal oxides such as sodium oxide, calcium oxide, aluminum oxide, magnesium oxide, potassium oxide, ferric oxide and the like. Therefore, glass per se is in fact a modified material of the "whole body" of silicon dioxide (as shown in FIG. 3), that is, an excellent raw material for processing and producing water treatment filter materials. Simple glass is a non-metallic material of silicates formed by melting silicon dioxide together with other chemical substances (main production materials are: soda ash, limestone and quartz), wherein a continuous network structure is formed during the melting process, the viscosity increases gradually during the cooling process, which leads to hardening and accordingly leads to crystallization. Therefore, simple glass is actually a mixture of about 70% silicon dioxide and about 30% other metal oxides.

As for the lightweight filter material provided in the present disclosure, a metal oxide modifier is added so as to modify the lightweight filter material prepared from waste glass, and a novel porous "whole-body" modified lightweight filter material for water treatment having properties of e.g. light weight, high isoelectric point, large specific surface area, strong abrasive resistance and long service life is obtained through modification, hereby completely solving the problem of the surface-modified quartz sand filter material regarding short service life, solving the problem of poor abrasive resistance of existing filter materials, and accordingly improving the water treatment effect and ensuring the stability of the quality of treated water.

Preferably, the lightweight modified filter material has a specific weight of 1.2-1.8 kg/L.

Preferably, the lightweight modified filter material has a void ratio of 60%-78%.

The natural bulk unit weight, the void ratio and the specific weight of the lightweight filter material are further defined. On the one hand, the requirement on the expansion ratio is satisfied, on the other hand, the capability of the filter layer to accommodate suspended pollutants is also improved, wherein the capability of capturing suspended matters in the water body to be filtered and the filtering capacity per unit time are improved greatly, and the water treatment performance of the lightweight filter material after the modification is ensured.

Preferably, the lightweight modified filter material is mainly prepared from the components in the following parts by mass:

80-95 parts of waste glass, 5-15 parts of a metal oxide modifier and 1-5 parts of a foaming agent.

The proportions of the waste glass, the metal oxide modifier and the foaming agent are further optimized.

Preferably, the metal oxide modifier is selected from one or a combination of several of titanium oxide, ferric oxide, aluminum oxide and magnesium oxide.

Taking $TiO_2$ as example, it forms a $[TiO_4]$-tetrahedron in silicate glass, and forms a Si—O—Ti-bond with $[SiO_4]$-tetrahedron so as to enter the network, hereby increasing the polymerization degree of the structure and accordingly improving the hardness and the toughness of the glass body; meanwhile, the quantity of free oxygen on the fracture surface of glass is reduced, accordingly, the isoelectric point is raised, and the capability of adsorbing pollutants is improved.

Preferably, the foaming agent is selected from one or a combination of several of carbon black, silicon carbide, calcium carbonate, dolomite powders, phlogopite, graphite and manganese dioxide.

The foaming accelerator has a fluxing (enabling the reduction in the softening temperature of glass powders and the reduction in the viscosity, which facilitates the foaming) effect, and can improve the surface tension of glass, facilitating stabilizing and controlling air bubbles, wherein the cell structure is improved, such that the cells are uniform and small, which is conducive to the increase in the strength of the product. A proper amount of the modifier can improve the performance of foam glass, enlarge the foaming temperature range, reduce intercommunicating pores, increase the mechanical strength, and improve the rate of finished products.

Preferably, the lightweight modified filter material has a particle size of 0.5-2.0 mm.

Preferably, the lightweight modified filter material has a natural bulk unit weight of 0.5-1.8 kg/L.

It should be clarified that in the present disclosure, the waste glass may be simple glass or foam glass, for example, defective products as well as leftover bits and pieces obtained in existing foam glass building material manufacturing enterprises may be selected as raw materials for foam glass, so as to realize the recycling of waste resources.

When being used as raw material for glass, foam glass has a small specific weight, and in case of backwashing, it would easily cause expansion of the filter material layer (with a maximum expansion ratio of 200%), thus, under the effect of the turbulent flow and the shear force of the water body, coagulated matters adhering to the surface of the filter material would easily be stripped off. Therefore, not only rapid backwashing is realized, but also the water consumption for backwashing is greatly reduced, and the backwashing time and the power consumption are accordingly reduced, moreover, the filtration treatment capability is strong and the quality of treated water is good, hereby achieving effects of high efficiency, energy saving and environmental protection.

In addition, since the foam glass is rough and uneven in surface and has properties such as irregularity, multi-angularity, high void ratio, large specific surface area and porosity, metal oxides would easily enter the glass network, so as to further increase the polymerization degree of the structure and get rid of the inherent "brittleness" of glass.

Furthermore, due to the high void ratio of the foam glass, the capability of the filter layer to accommodate suspended pollutants is also greatly improved. Therefore, the filtration rate and the efficiency can be greatly improved, and the dimension of filtration facilities can be accordingly greatly reduced, hereby reducing the floor area of treatment facilities.

Preferably, the foam glass has a void ratio of 60%-78%; and the specific weight of the foam glass is 1.2-1.7 kg/L.

The filtration rate of the foam glass is 20-30 m/hr; and the expansion ratio of the foam glass is at most 200%.

The foam glass has a natural bulk unit weight of 0.5-0.9 kg/L.

The specific surface area of the foam glass is 25-35 $m^2/g$.

In the present disclosure, the specific weight of the foam glass filter material is preferably defined to be between 1.2 and 1.7 kg/L, and the specific surface area of the foam glass having this specific weight is 25-35 $m^2/g$; on this account, an expansion ratio of about 200% can be realized, thus, under the effect of the turbulent flow and the shear force of the water body, coagulated matters adhering to the surface of the filter material would easily be stripped off, so as to realize the effects of rapid backwashing and reduction in the backwashing time and in the water consumption, with less energy consumption. Based on the same reason, the natural bulk unit weight of the foam glass filter material or the void ratio and the specific surface area thereof are further defined, on the one hand, the requirement on the expansion ratio is satisfied, on the other hand, the capability of the filter layer to accommodate suspended pollutants is also improved, wherein the capability of capturing suspended matters in the water body to be filtered and the filtering capacity per unit time are improved greatly.

The present disclosure further provides a method of preparing the lightweight modified filter material, comprising the following steps:

crushing, pulverizing and grinding waste glass; then adding a metal oxide modifier and a foaming agent; heat-melting, foaming, solidifying and cooling the mixture, pulverizing the mixture after cooling, and performing screening of the particle size to obtain the lightweight modified filter material.

In the method of preparing a lightweight filter material provided in the present disclosure, waste glass powders obtained by crushing, washing and drying are used as main raw material; specific parts of a metal oxide modifier and of a foaming agent are added; and a lightweight filter material is prepared after finely pulverizing and uniform mixing, and then melting at high temperature, foaming and annealing. After processes of further pulverization, screening and the like, a novel whole-body modified glass filter material for water treatment with light weight, high isoelectric point, large specific surface area and porosity is prepared.

Preferably, the crushed glass fragments are of a size of 3-5 cm; and the pulverized glass has a particle size of 50-200 μm.

The specific treatment of waste glass ensures the specific surface area and the particle size of the finally prepared lightweight filter material, and ensures its treatment effect in water treatment applications.

Preferably, the foaming process specifically comprises the following step:

raising the temperature of a melting-foaming machine to 600-1100° C. with a heating rate of 8-12° C./minute, and performing the foaming for 2-4 hours.

During the melting and foaming process, the furnace temperature of the melting-foaming machine (melting-foaming furnace) is raised to 600-1100° C. preferably with a heating rate of 10° C./minute, wherein this heating rate and the final foaming temperature can ensure sufficient foaming of the mixed raw materials. Moreover, the foaming time is controlled to be within 2-4 hours, and generally, the foaming time is relatively longer, when the melting-foaming temperature is relatively low; on the contrary, the foaming time is relatively shorter, if the melting-foaming temperature is relatively high.

In the present disclosure, the waste glass may be foam glass, and a method of preparing the foam glass comprises the following steps:

1) adding a foaming agent, a foaming accelerator and a modifier into superfine glass powders and then mixing the same, so as to obtain mixed raw materials; and 2) melting and foaming the mixed raw materials and then cooling the same, hereby obtaining foam glass.

Optionally, in step 1), in parts by weight, there are 93-97 parts of the superfine glass powders, 2-4 parts of the foaming agent, and 1-3 parts of the foaming accelerator and the modifier.

Specific parts by weight of the foaming agent, the foaming accelerator and the modifier are added into the superfine glass powders; the foaming accelerator has a fluxing (enabling the reduction in the softening temperature of glass powders and the reduction in the viscosity, which facilitates the foaming) effect, and can improve the surface tension of glass, facilitating stabilizing and controlling air bubbles, wherein the cell structure is improved, such that the cells are uniform and small, which is conducive to the increase in the strength of the product. A proper amount of the modifier can improve the performance of foam glass, enlarge the foaming temperature range, reduce intercommunicating pores, increase the mechanical strength, and improve the rate of finished products.

Optionally, the foaming agent comprises one or more of carbon black, silicon carbide, calcium carbonate, dolomite powders, phlogopite, graphite and manganese dioxide; the foaming accelerator is at least one selected from the group consisting of sodium nitrate, soda ash, borax, sodium fluorosilicate, sodium carbonate and ethylenediamine salts; and the modifier is at least one selected from the group consisting of antimonous oxide, sodium pyrophosphate and barium sulfate.

Optionally, before step 1), the method further comprises the following step: crushing waste glass (simple glass is usually used) to obtain glass fragments of 3-5 mm, and pulverizing the glass fragments to obtain superfine glass powders having a particle size of 100-400 μm.

Optionally, the melting and foaming process in step 2) specifically comprises the step of:

raising the temperature of a melting-foaming machine to 600-1100° C. with a heating rate of 8-12° C./minute, and performing the foaming for 2-4 hours.

During the melting and foaming process, the furnace temperature of the melting-foaming machine (melting-foaming furnace) is raised to 600-1100° C. preferably with a heating rate of 10° C./minute, wherein this heating rate and the final foaming temperature can ensure sufficient foaming of the mixed raw materials. Moreover, the foaming time is controlled to be within 2-4 hours, and generally, the foaming time is relatively longer, when the melting-foaming temperature is relatively low; on the contrary, the foaming time is relatively shorter, if the melting-foaming temperature is relatively high. In addition, during the cooling process, in order to ensure the performance of the foam glass, natural cooling is preferably adopted, wherein this cooling mode is slow and soft, and thus, any change in product performance caused by shock cooling can be prevented.

Optionally, in step 2), re-pulverization and screening are successively performed after the cooling process. The granularity after the re-pulverization is 0.5-1.0 millimeter. Out of the pulverized particles, filter materials having different particle sizes can be screened out according to actual demands, so as to satisfy the application demands as raw materials.

The present disclosure further provides the use of the lightweight modified filter material as water filtering medium.

Example 1

Glass fragments of 3 mm were obtained by crushing waste simple glass, and the glass fragments were pulverized to obtain superfine glass powders having a particle size of 100 μm;

1 part of a foaming agent (carbon black) and 5 parts of a metal oxide modifier (titanium oxide) were added into 75 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 600° C. with a heating rate of 10° C./minute and the foaming was performed for 3 hours, and then solidification and cooling were performed, and pulverization was performed after cooling, wherein the particle size was screened, hereby obtaining this lightweight modified filter material.

Example 2

Glass fragments of 4 mm were obtained by crushing waste simple glass, and the glass fragments were pulverized to obtain superfine glass powders having a particle size of 200 μm;

10 parts of a foaming agent (calcium carbonate) and 20 parts of a metal oxide modifier (ferric oxide) were added into 100 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 1100° C. with a heating rate of 10° C./minute and the foaming was performed for 2 hours, and then solidification and cooling were performed, and pulverization was performed after cooling, wherein the particle size was screened, hereby obtaining this lightweight modified filter material.

Example 3

Glass fragments of 5 mm were obtained by crushing waste simple glass, and the glass fragments were pulverized to obtain superfine glass powders having a particle size of 300 μm;

10 parts of a foaming agent (graphite) and 5 parts of a metal oxide modifier (aluminum oxide) were added into 80 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 800° C. with a heating rate of 10° C./minute and the foaming was performed for 4 hours, and then solidification and cooling were performed, and pulverization was performed after cooling, wherein the particle size was screened, hereby obtaining this lightweight modified filter material.

Example 4

Glass fragments of 4 mm were obtained by crushing waste simple glass, and the glass fragments were pulverized to obtain superfine glass powders having a particle size of 400 μm;

5 parts of a foaming agent (graphite) and 15 parts of a metal oxide modifier (aluminum oxide) were added into 95 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 1000° C. with a heating rate of 10° C./minute and the foaming was performed for 3 hours, and then solidification and cooling were performed, and pulverization was performed after cooling, wherein the particle size was screened, hereby obtaining this lightweight modified filter material.

Example 5

Defective products as well as leftover bits and pieces obtained in foam glass building material manufacturing enterprises were selected as raw materials for foam glass, glass fragments of 3 mm were obtained by crushing the foam glass, and the glass fragments were pulverized to obtain superfine glass powders having a particle size of 100 μm;

1 part of a foaming agent (carbon black) and 5 parts of a metal oxide modifier (titanium oxide) were added into 75 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 600° C. with a heating rate of 10° C./minute and the foaming was performed for 3 hours, and then solidification and cooling were performed, and pulverization was performed after cooling, wherein the particle size was screened, hereby obtaining this lightweight modified filter material.

Example 6

A foaming agent (magnesium carbonate or sodium bicarbonate), a foaming accelerator (borax) and a modifier (barium sulfate) were added into (directly purchased) superfine glass powders (having a particle size of about 400 μm) and then mixed uniformly, hereby obtaining mixed raw materials; and foam glass was obtained by melting and foaming (at a temperature not lower than 600° C.) the mixed raw materials and then cooling the same.

Glass fragments were obtained by crushing the foam glass, and the glass fragments were pulverized to obtain superfine glass powders having a particle size of 200 μm;

10 parts of a foaming agent (calcium carbonate) and 20 parts of a metal oxide modifier (ferric oxide) were added into 100 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 1100° C. with a heating rate of 10° C./minute and the foaming was performed for 2 hours, and then solidification and cooling were performed, and pulverization was performed after cooling, wherein the particle size was screened, hereby obtaining this lightweight modified filter material.

Example 7

Glass fragments of 3-5 mm were obtained by crushing waste glass, and the glass fragments were pulverized to obtain superfine glass powders having a particle size of 100-400 μm; 2 parts of a foaming agent (carbon black), and 1 part of a foaming accelerator (sodium nitrate) and a modifier (sodium pyrophosphate) were added into 97 parts by weight of the superfine glass powders and then mixed uniformly, hereby obtaining mixed raw materials; and foam glass was obtained by melting and foaming the mixed raw materials and then cooling the same, wherein during the melting and foaming process, the temperature of the melting-foaming furnace was raised to 600° C. with a heating rate of 10° C./minute and foaming was performed for 3-4 hours.

Glass fragments were obtained by crushing the foam glass, and the glass fragments were pulverized to obtain superfine glass powders having a particle size of 300 μm;

10 parts of a foaming agent (graphite) and 5 parts of a metal oxide modifier (aluminum oxide) were added into 80 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 800° C. with a heating rate of 10° C./minute and the foaming was performed for 4 hours, and then solidification and cooling were performed, and pulverization was performed after cooling, hereby obtaining this lightweight modified filter material.

Example 8

Glass fragments of 3-5 mm were obtained by crushing waste glass, and the glass fragments were pulverized to obtain superfine glass powders having a particle size of 100-400 μm; 3 parts of a foaming agent (manganese dioxide), and 2 parts (in equal proportion) of a foaming accelerator (soda ash) and a modifier (sodium pyrophosphate) were added into 95 parts by weight of the superfine glass powders and then mixed uniformly, hereby obtaining mixed raw materials; and foam glass was obtained by melting and foaming the mixed raw materials and then naturally cooling the same, wherein during the melting and foaming process, the temperature of the melting-foaming furnace was raised to 800° C. with a heating rate of 10° C./minute and foaming was performed for 3-4 hours.

Glass fragments were obtained by crushing the foam glass, and the glass fragments were pulverized to obtain superfine glass powders having a particle size of 400 μm; 5 parts of a foaming agent (graphite) and 15 parts of a metal oxide modifier (aluminum oxide) were added into 95 parts by weight of the superfine glass powders, and then mixed uniformly, hereby obtaining mixed raw materials; and the mixed raw materials were melted and foamed, and then successively underwent cooling and re-pulverization, hereby obtaining foam glass, wherein during the melting and foaming process, the temperature of the melting-foaming furnace was raised to 1000° C. with a heating rate of 10° C./minute and the foaming was performed for 3 hours, and then solidification and cooling were performed, and pulverization was performed after cooling, wherein the particle size was screened, hereby obtaining this lightweight modified filter material.

Comparative Example

The application of the application No. 201510514379.2 provides a foam glass filter material.

Experimental Example 1: Strength Test

A strength test is made on the lightweight modified filter material provided in the present disclosure and the filter material provided in the comparative example, and the experimental results are shown in Table 1.

TABLE 1

Strength Test Results

| Items | Bending strength (MPa) | Compressive strength (MPa) |
|---|---|---|
| Example 1 | 5 | 7 |
| Example 2 | 6 | 8.5 |
| Example 3 | 9 | 9.2 |
| Example 4 | 10 | 10 |
| Example 5 | 10 | 12 |
| Example 6 | 11 | 13 |
| Example 7 | 14 | 14.5 |
| Example 8 | 15 | 15 |
| Comparative Example | 0.5 | 0.7 |

The experimental results show that without changing the apparent physical performance of the original foam glass filter material (comparative example) in aspects of specific surface area and specific weight and the like (making sure that the advantages of the original foam glass filter material remain unchanged), the strength of the original foam glass filter material is greatly improved, wherein the bending strength is increased from the original 0.5 MPa to 5-15 MPa, the compressive strength is increased from the original 0.7 MPa to 7-15 MPa, especially, the service life of the filter material is improved by 3-4 times by direct modification on the foam glass, and the loss rate of annual wastage of the filter material is reduced from 10% to 3%.

Experimental Example 2: Filtration Result Comparison Experiment, Wherein the Results are Shown in Table 2

TABLE 2

Filtration Test Results

| Items | Filter chamber using traditional quartz sand as filter material | Comparative Example | The lightweight modified filter material provided in the embodiments of the present disclosure |
|---|---|---|---|
| Filtration rate | 7 m/hr | 21 m/hr | 21 m/hr |
| Backwashing time | 20-30 min | 6-8 min | 6-8 min |
| Water consumption for backwashing | 4.8 m$^3$ | 1.5 m$^3$ | 1.5 m$^3$ |
| Gas consumption for backwashing | 17.28 m$^3$ | 1.5 m$^3$ | 1.5 m$^3$ |
| Turbidity of treated water (NTU) 1 | 0.533 | 0.213 | 0.05 |
| 2 | 0.593 | 0.202 | 0.07 |
| 3 | 0.592 | 0.179 | 0.06 |
| 4 | 0.545 | 0.191 | 0.07 |

The experimental results show that because of the addition of a functional metal oxide (such as titanium oxide, aluminum oxide and the like) during the preparation process of the filter material, the capability of the filter material to adsorb the pollutants in water is enhanced, so that the quality of the filtered water is greatly improved. During the treatment process of pure water (tap water), the turbidity of treated water filtered by conventional sand is 0.5-1.0 NTU; the turbidity of treated water filtered by the filter material provided in the invention with the application No. 201510514379.2 is about 0.2 NTU; and the turbidity of treated water filtered by the filter material according to the present disclosure can be below 0.1 NTU.

Although the present disclosure has already been explained and described referring to specific embodiments, it shall be aware that the above respective embodiments are merely used to explain the technical solutions of the present disclosure, rather than limiting the same; and it should be understandable for a person ordinarily skilled in the art that modifications could still be made to the technical solutions recorded in the preceding respective embodiments, or partial or all technical features therein could be substituted with equivalents, without departing from the spirit and the scope of the present disclosure; and these modifications or substitutions do not make the essence of the respective technical solutions depart from the scope of the technical solutions of the respective embodiments of the present disclosure; thus, it means that all these substitutions and modifications falling in the scope of the present disclosure are included in the appended claims.

INDUSTRIAL APPLICABILITY

The lightweight modified filter material according to the present disclosure has the advantages of light weight, large specific surface area, high isoelectric point, porosity and the like, with the isoelectric point and the service life of the filter material being improved. Through the method of preparing a lightweight modified filter material according to the present disclosure, the polymerization degree of the structure is improved, the isoelectric point of the glass body is also increased, while the hardness and the toughness of the glass body are raised, accordingly, not only the service life of the foam glass filter material is prolonged, but the filtration effect is also improved, and the practicability and the economic efficiency thereof are increased in turn.

The invention claimed is:

1. A lightweight modified filter material, wherein the lightweight modified filter material is prepared from components in parts by mass as follows:
   75-100 parts of waste glass, 5-20 parts of a metal oxide modifier and 1-10 parts of a foaming agent, wherein the metal oxide modifier is at least one selected from the group consisting of ferric oxide and magnesium oxide;
   the lightweight modified filter material has a specific weight of 1.2-1.8 kg/L; and
   the lightweight modified filter material has a void ratio of 60%-78%, wherein the waste glass is foam glass, and a specific surface area of the foam glass is 25-35 m2/g.

2. The lightweight modified filter material according to claim 1, wherein the lightweight modified filter material is mainly prepared from components in parts by mass as follows: 80-95 parts of the waste glass, 5-15 parts of the metal oxide modifier and 1-5 parts of the foaming agent.

3. The lightweight modified filter material according to claim 1, wherein the foaming agent is at least one selected from the group consisting of carbon black, silicon carbide, calcium carbonate, dolomite powders, phlogopite, graphite and manganese dioxide.

4. The lightweight modified filter material according to claim 1, wherein the lightweight modified filter material has a particle size of 0.5-2.0 mm.

5. The lightweight modified filter material according to claim 1, wherein the foam glass has a void ratio of 60%-78%; and a specific weight of the foam glass is 1.2-1.7 kg/L.

6. The lightweight modified filter material according to claim 1, wherein an expansion ratio of the foam glass is at most 200%.

7. A method for preparing the lightweight modified filter material according to claim 1, comprising following steps:
   crushing, pulverizing and grinding the waste glass; then adding the metal oxide modifier and the foaming agent; heat-melting, foaming, solidifying and cooling a mixture; pulverizing the mixture after cooling; and performing screening of a particle size, to obtain the lightweight modified filter material.

8. The method for preparing the lightweight modified filter material according to claim 7, wherein crushed glass fragments are of a size of 3-5 centimeters; and pulverized glass has a particle size of 50-200 μm.

9. The method for preparing the lightweight modified filter material according to claim 7, wherein a foaming process further comprises following step:
   raising a temperature of a melting-foaming machine to 600-1100° C. with a heating rate of 8-12° C./minute, and performing the foaming for 2-4 hours.

10. The method for preparing the lightweight modified filter material according to claim 7, wherein the waste glass is foam glass, and a method for preparing the foam glass comprises following steps:
   1) adding a foaming agent, a foaming accelerator and a modifier into superfine glass powders and then mixing the same, so as to obtain mixed raw materials; and
   2) melting and foaming the mixed raw materials and then cooling the same, so as to obtain the foam glass.

11. The method for preparing the lightweight modified filter material according to claim 10, wherein in step 1), in parts by weight, the superfine glass powders are of 93-97 parts, the foaming agent is of 2-4 parts, and the foaming accelerator and the modifier are of 1-3 parts.

12. The method for preparing the lightweight modified filter material according to claim 10, wherein the foaming accelerator is at least one selected from the group consisting of sodium nitrate, soda ash, borax, sodium fluorosilicate, sodium carbonate and ethylenediamine salts; and the modifier is at least one selected from the group consisting of antimonous oxide, sodium pyrophosphate and barium sulfate.

13. The method for preparing the lightweight modified filter material according to claim 10, wherein before step 1), the method further comprises following step: crushing the waste glass to obtain glass fragments of 3-5 mm, and pulverizing the glass fragments to obtain the superfine glass powders having a particle size of 100-400 μm.

\* \* \* \* \*